United States Patent
Natsume

(10) Patent No.: US 9,061,657 B2
(45) Date of Patent: Jun. 23, 2015

(54) WIPER DEVICE

(71) Applicant: ASMO CO., LTD., Kosai, Shizuoka-pref. (JP)

(72) Inventor: Takashi Natsume, Toyohashi (JP)

(73) Assignee: ASMO CO., LTD., Shizuoka (JP)

( * ) Notice: Subject to any disclaimer, the term of this patent is extended or adjusted under 35 U.S.C. 154(b) by 138 days.

(21) Appl. No.: 13/937,222

(22) Filed: Jul. 9, 2013

(65) Prior Publication Data

US 2014/0013535 A1  Jan. 16, 2014

(30) Foreign Application Priority Data

Jul. 10, 2012  (JP) .................................. 2012-154843
Jul. 10, 2012  (JP) .................................. 2012-154912

(51) Int. Cl.
*H02P 1/00* (2006.01)
*B60S 1/08* (2006.01)
*B60S 1/24* (2006.01)

(52) U.S. Cl.
CPC ................. *B60S 1/0818* (2013.01); *B60S 1/08* (2013.01); *B60S 1/245* (2013.01)

(58) Field of Classification Search
CPC ........................................................ H02P 5/74
USPC ........................................ 318/255, 34, 35, 37
See application file for complete search history.

(56) References Cited

U.S. PATENT DOCUMENTS 6,107,766 A * 8/2000 Amagasa ...................... 318/443

FOREIGN PATENT DOCUMENTS

| JP | 2003-54375 A | 2/2003 |
| JP | 2010-159044 A | 7/2010 |
| JP | 2013-519554 A | 5/2013 |

* cited by examiner

*Primary Examiner* — David S Luo
(74) *Attorney, Agent, or Firm* — Solaris Intellectual Property Group, PLLC

(57) ABSTRACT

A wiper device comprising a wiper motor; a storage section storing specific positions at an upper and a lower portions of a region on the window glass where the wiper blade swings as a first upper stop target position and a first lower stop target position, and also storing specific ranges from the first upper stop target position to a lower side and from the first lower stop target position to an upper side as an upper and a lower permissible stop ranges; a detection section that detects rotation speed and rotation angle of the wiper motor; and a control section that identifies the wiper blade position, reduces the rotation speed of the wiper motor as the swinging wiper blade approaches the upper or the lower permissible stop range, and stops the wiper motor rotation when the wiper blade has stopped in the upper or the lower permissible stop range.

7 Claims, 11 Drawing Sheets

![US 9,061,657 B2]

WIPER DEVICE

CROSS-REFERENCE TO RELATED APPLICATION

This application claims priority under 35 USC 119 from Japanese Patent Application No. 2012-154843 filed Jul. 10, 2012 and No. 2012-154912 filed Jul. 10, 2012, the disclosures of which are incorporated by reference herein.

BACKGROUND OF THE INVENTION

1. Technical Field

The present invention relates to a wiper device.

2. Related Art

In Japanese Patent Application Laid-Open (JP-A) No. 2003-54375 (Publication 1) there is a description of a wiper control device equipped with a switching means that interrupts power supplied to a wiper motor when a wiper blade that is moving towards a return position has reached just-in-front of the return position.

In the wiper control device of Publication 1, the switching means interrupts power supply to the wiper motor just-in-front of the return position, such that the wiper blade is coasted thereby reducing irregular noise of returning of the wiper blade at the return position.

A wiper device and wiper control method are described in JP-A No. 2010-159044 (Publication 2) that prevent a wiper from flipping up under wind pressure due to motion wind by increasing the rotation force of a wiper motor when a speed of a vehicle increases to generate a strong motion wind.

In the wiper device and wiper control method of Publication 2, a sensor is disposed for detecting an rotation angle of an output shaft in a gear housing of a wiper motor, so as to enable detection of current position of a wiper blade that is swinging to-and-fro with forward and reverse rotation of a wiper motor. Moreover, in this wiper device and wiper control method, the rotation force of the wiper motor 18 is controlled according to the speed of the vehicle detected by a vehicle speed sensor so as to maintain the wiper blade in a lower return position.

FIG. 11 is a diagram illustrating a sensor signal angle that is a rotation angle detected by a sensor and the actual operation angle of an output shaft in an ordinary wiper device, such as that of the wiper device and wiper control method of Publication 2. In FIG. 11, configuration is made such that when the sensor signal angle reads 0°, the output shaft actual operation angle is also 0°, and the wiper blade is stopped at a stowing position provided at the lowest portion on the window glass when the output shaft actual operation angle is 0°.

SUMMARY

However, the wiper control device of Publication 1 has an issue in that the wiper blade is abruptly decelerated by interrupting power supplied to the wiper motor, with this being detrimental to the smooth operation of the wiper device and making it more likely that irregular noise is generated.

Sensors employed in wiper devices and wiper control methods generally have measurable angles of from 0° to 180°. Such a type of sensor is employed in the technology described in Publication 2, leading to a concern that when a stowing position is placed at the position where the sensor signal angle is 0°, as illustrated in FIG. 11, in situations in which the wiper blade overruns the 0°, say by swinging an extra 2°, the control unit interprets this as being 178°, and make the swing direction of the wiper blade in an opposite direction.

In consideration of the above circumstances, the present invention enables suppression of irregular noise generation when a wiper blade returns or stops, and provides a wiper device capable of operating smoothly.

The present invention provides a wiper device capable of ensuring that the swing direction of the wiper blade is prevented from being wrongly reversed even when the wiper blade overruns a specific position for stopping and returning on the window glass.

In order to address the above issues, a wiper device of a first aspect of the present invention includes: a wiper motor that rotates forwards and rotates backwards at a specific rotation angle, and swings a wiper blade coupled to the wiper motor through a wiper arm to-and-fro across a window glass; a storage section that is stored with specific positions at an upper portion and a lower portion of a region on the window glass where the wiper blade swings to-and-fro as a first upper stop target position and a first lower stop target position. The first upper stop target position and the first lower stop target position are positions where the wiper blade is intended to stop. And the storage section is stored with specific ranges from the first upper stop target position to a lower side and the first lower stop target position to an upper side on the window glass as an upper permissible stop range and a lower permissible stop range. The upper permissible stop range and the lower permissible stop range are ranges where the wiper blade is allowed to stop. The wiper device further includes a detection section that detects the rotation speed and the rotation angle of the wiper motor; and a control section that refers to the storage means, identifies the position of the wiper blade on the window glass based on the rotation angle of the wiper motor detected by the detection means, reduces the rotation speed of the wiper motor as the to-and-fro swinging wiper blade approaches the upper permissible stop range or the lower permissible stop range, and stops the wiper motor rotation when the wiper blade has stopped in the upper permissible stop range or in the lower permissible stop range.

According to this wiper device, the rotation speed of the wiper motor is reduced as the wiper blade approaches the upper permissible stop range or the lower permissible stop range, enabling generation of irregular noise to be suppressed when the wiper blade returns or stops, and enabling smooth operation of the wiper device to be assured.

Moreover, the wiper blade stops in the lower permissible stop range provided towards the bottom of the window glass, whereby wiper blade stopping positions is suppressed to be vary, and a wipeable range by a wiper blade can be set to be a wide range outside of the lower permissible stop range.

A wiper device of a second aspect of the present invention is the wiper device of the first aspect, wherein the control means reduces the rotation speed of the wiper motor as the swinging wiper blade approaches the first upper stop target position or the first lower stop target position from the vicinity of a midpoint in the to-and-fro swing process, stops the wiper motor rotation when the wiper blade has stopped in the upper permissible stop range or in the lower permissible stop range, and after stopping, rotates the wiper motor in an opposite direction to the direction prior to stopping so as to swing the wiper blade that has stopped in the upper permissible stop range or the lower permissible stop range.

According to this wiper device, since the rotation speed of the wiper motor is reduced as the wiper blade approaches the stop target position, the wiper blade can be returned even in cases in which the wiper blade has stopped prior to the stop target position, due to sliding resistance arising from friction between the wiper blade and the window glass or wind pressure.

In such a wiper device, the wiper blade can be returned from the permissible stop range even without re-swinging the wiper blade to the stop target position as long as the stop position of the wiper blade is in the permissible stop range, thereby enabling the wiper blade to swing to-and-fro smoothly.

A wiper device of a third aspect of the present invention is the wiper device of the first aspect or the second aspect, wherein: the wiper device further includes a wiper switch to input an instruction to operate or stop the wiper motor; the storage section is respectively stored with a lower return position and a stowing position as the first lower stop target position, the lower return position is the position where the to-and-fro swinging wiper blade stops in order to return and the stowing position is provided at a lower portion of the lower return position in order to stow the wiper blade. The storage section is stored with a specific range from the lower return position to an upper side on the window glass as a first lower permissible stop range and a specific range from the stowing position to an upper side on the window glass as a second lower permissible stop range. The first and second lower permissible stop ranges are ranges where the wiper blade is allowed to stop. And the control section reduces the rotation speed of the wiper motor as the wiper blade approaches the lower return position when, during to-and-fro swinging of the wiper blade, an instruction is input from the wiper switch to stop the wiper motor; rotates the wiper motor at a slower speed to that of to-and-fro swinging after the wiper blade has stopped in the first lower permissible stop range including the lower return position; reduces the rotation speed of the wiper motor as the wiper blade approaches the stowing position; and stops the wiper motor rotation when the wiper blade has stopped in the second lower permissible stop range including the stowing position.

According to this wiper device, when the wiper switch is switched OFF, the wiper blade is rotated to the stop target position for stowing at a slower speed than that of to-and-fro swinging after the to-and-fro swinging wiper blade has been temporarily stopped at the lower return position. Wiper blade overrun due to excessive speed can accordingly be prevented.

According to this wiper device, the rotation speed of the wiper motor is reduced as the wiper blade approaches the stop target position, thereby enabling the abrupt deceleration of the wiper blade at the stop target position to be avoided, and enabling generation of irregular noise accompanying abrupt deceleration to be suppressed.

A wiper device of a fourth aspect of the present invention is the wiper device of the first aspect, wherein: a second upper stop target position is provided in the upper permissible stop range; a second lower stop target position is provided in the lower permissible stop range; and the control means reduces the rotation speed of the wiper motor as the swinging wiper blade approaches the second upper stop target position or the second lower stop target position from the vicinity of a midpoint in the to-and-fro swing process.

According to this wiper device, overrun and abrupt deceleration of the wiper blade at the first upper stop target position or the first lower stop target position can be prevented by reducing the rotation speed of the wiper motor as the wiper blade approaches the second upper stop target position or the second lower stop target position respectively provided in the upper permissible stop range and the lower permissible stop range.

A wiper device of a fifth aspect of the present invention is the wiper device of the third aspect wherein the control means moves the wiper blade towards the stowing position without stopping in the first lower permissible stop range when, during to-and-fro swinging of the wiper blade, an instruction is input from the wiper switch to stop the wiper motor; reduces the rotation speed of the wiper motor as the wiper blade approaches the stowing position; and stops the wiper motor rotation when the wiper blade has stopped in the second lower permissible stop range including the stowing position.

According to this wiper device, the wiper blade can be stopped in the stowing position without temporarily stopping the wiper blade in the first lower permissible stop range.

A wiper device of another aspect of the present invention includes: a wiper motor that rotates forwards and rotates backwards with a specific range of rotation angles, and swings a wiper blade coupled to the wiper motor through a wiper arm to-and-fro across a surface of a window glass; a detection section that detects a rotation angle of the wiper motor in a detection range including the specific range of rotation angles of the wiper motor; and a control section that controls the wiper motor rotation so as to stop or return the wiper blade at a specific position at a lower portion of the window glass when the rotation angle of the wiper motor detected by the detection section is at a specific angle which is equal to or greater than a lower limit value of the detection range, and controls the wiper motor rotation so as to return the wiper blade at a specific position at an upper portion of the window glass when the rotation angle of the wiper motor detected by the detection section is at a specific angle which is equal to or lower than an upper limit value of the detection range. And the specific angle which is equal to or greater than the detection range lower limit value is set such that, even when the wiper blade has passed the specific position at the lower portion, the detected rotation angle of the wiper motor that is corresponds to a position of the wiper blade is at the lower limit value of the detection range or greater.

According to this wiper device, the wiper blade is returned at the specific position at the lower portion of the window glass when the detected rotation angle of the wiper motor is at a specific angle which is equal to or greater than the detection range lower limit value.

Moreover, with this wiper device, even when the wiper blade has passed the specific position at the lower portion, the specific angle at the detection range lower limit value or greater is set such that rotation angle of the wiper motor detected by the detection section is at the detection range lower limit value or greater.

Consequently, according to this wiper device, the wiper blade swing direction can be effectively prevented from wrongly reversed even when the wiper blade overruns the specific position for stopping or returning.

A wiper device according to still another aspect of the present invention is the wiper device of the above aspect, wherein the control means interprets a central value of the specific range of the rotation angle of the wiper motor as being in the vicinity of a central value of the detection range.

According to this wiper device, the central value of the wiper motor rotation angle is interpreted as being in the vicinity of the central value of the sensor detection range, thereby enabling a range to be provided that allows the swinging wiper blade to overrun by about the same range at an upper edge position and a lower edge position of a swinging area of the wiper blade.

Consequently, according to this wiper device, the rotation direction of the wiper blade can be effectively prevented from reversing even when the wiper blade has overrun the specific position for stopping or returning.

BRIEF DESCRIPTION OF THE DRAWINGS

Exemplary embodiments of the present invention will be described in detail based on the following figures, wherein.

DETAILED DESCRIPTION OF THE INVENTION

Figure 1:
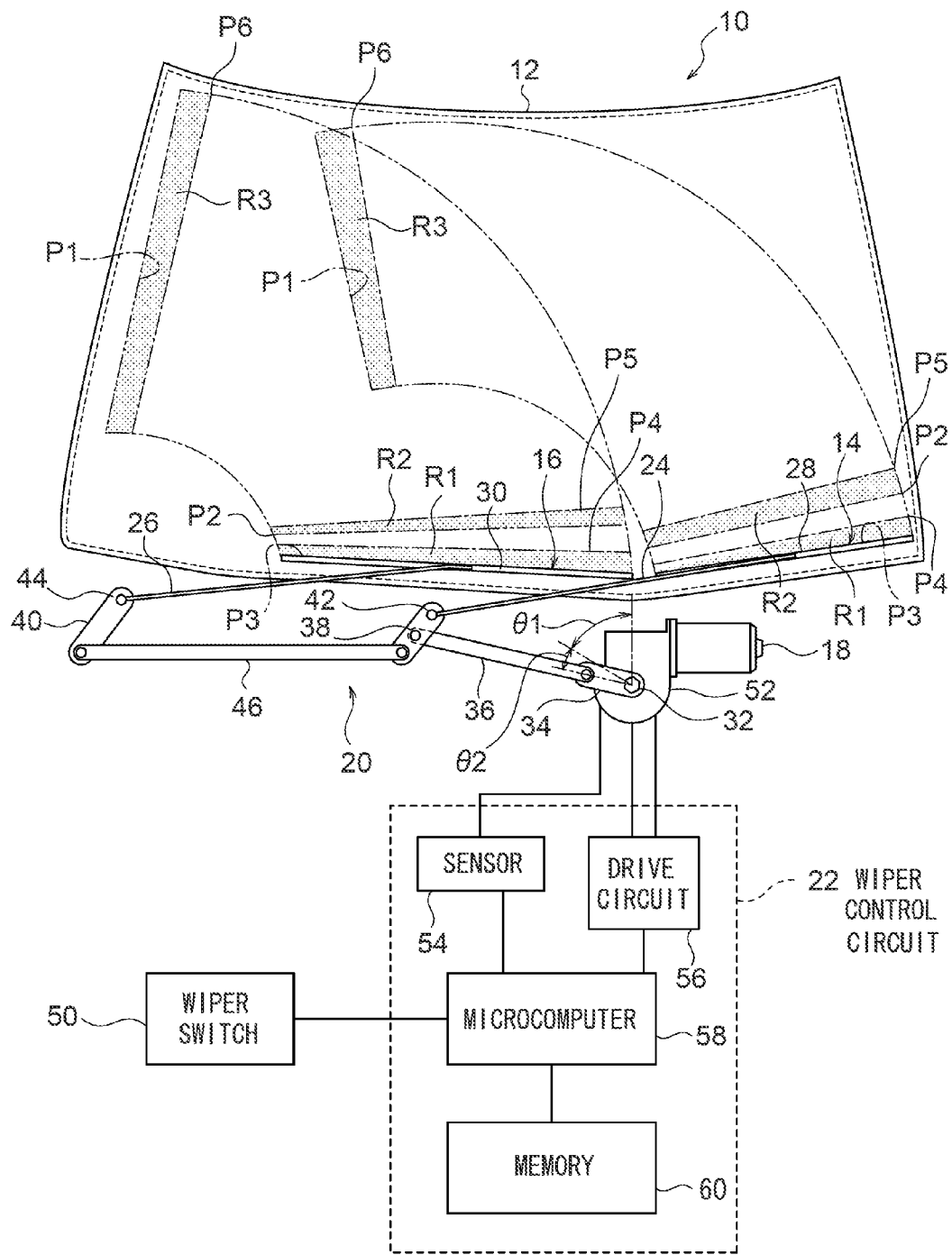
FIG. 1 is a schematic diagram illustrating a configuration of a wiper device according to a first exemplary embodiment of the present invention.

FIG. 1 is a schematic diagram illustrating a configuration of a wiper device 10 according to the present exemplary embodiment. The wiper device 10 is, for example, employed for wiping a front windshield 12 installed in a vehicle such as a passenger car. The wiper device 10 includes a pair of wipers 14 and 16, a wiper motor 18, a link mechanism 20, and a wiper control circuit 22.

The wipers 14 and 16 are respectively configured with wiper arms 24 and 26, and wiper blades 28 and 30. A base end portion of each of the wiper arms 24 and 26 is fixed respectively to pivot shafts 42 and 44, described later, and the wiper blades 28 and 30 are respectively fixed to leading end portions of the wiper arms 24 and 26.

In the wipers 14 and 16, the wiper blades 28 and 30 move to-and-fro over the front windshield 12 accompanying swinging of the wiper arms 24 and 26, thereby wiping the front windshield 12.

The wiper motor 18 includes an output shaft 32 that is forward-reverse rotatable through a speed reduction mechanism 52 configured mainly by a worm gear. The link mechanism 20 includes a crank arm 34, a first link rod 36, a pair of pivot levers 38 and 40, the pair of pivot shafts 42 and 44, and a second link rod 46.

One end side of the crank arm 34 is fixed to the output shaft 32, and the other end side of the crank arm 34 is connected to a first end side of the first link rod 36 so as to be capable of pivoting. Another end side of the first link rod 36 is connected to a location near to a second end of the pivot lever 38, opposite to a first end that has the pivot shaft 42, so as to be capable of pivoting. Two ends of the second link rod 46 are respectively pivotally connected to the second end of the pivot lever 38, and to an end of the pivot lever 40 that corresponds to the second end of the pivot lever 38.

The pivot shafts 42 and 44 are pivotally supported by pivot holders, not shown in the drawings, provided to the vehicle body. The wiper arms 24 and 26 are respectively fixed through the pivot shafts 42 and 44 to the first ends of the pivot levers 38 and 40 where the pivot shafts 42 and 44 are provided.

In the wiper device 10 according to the present exemplary embodiment, when the output shaft 32 is forward-reverse rotated with a first swing range θ1, the rotation force of the output shaft 32 is transmitted through the link mechanism 20 to the wiper arms 24 and 26, and the wiper blades 28 and 30 move to-and-fro over the front windshield 12 between a lower return position P2 and an upper return position P1 as the wiper arms 24 and 26 swing to-and-fro.

In the wiper device 10 of the present exemplary embodiment, as illustrated in FIG. 1, the crank arm 34 and the first link rod 36 configure a straight line when the wiper blades 28 and 30 are positioned at stowing position P3.

The stowing position P3 is provided below the lower return position P2. The wiper blades 28 and 30 are swung to the stowing position P3 from the lower return position P2 by the output shaft 32 rotating through θ2. The value of θ2 may take various values according to such factors as the configuration of the link mechanism of the wiper device, however the value of θ2 may be set so as to enable movement of the wiper blades 28 and 30 in a swing range from the lower return position P2 to the stowing position P3 provided from a few cm to 10 cm below the lower return position P2.

Note that when θ2 is "0", then the lower return position P2 and the stowing position P3 are aligned with each other, and the wiper blades 28 and 30 are stopped and stored at the lower return position P2.

In the present exemplary embodiment, a permissible stop position P4 is provided prior to the stowing position P3, with a permissible stop range R1 provided in a region between the permissible stop position P4 and the stowing position P3.

The wiper blades 28 and 30 ideally stop accurately at the stowing position P3 when the wiper blades are stopped.

However, in order that the wiper blades 28 and 30 do not abruptly stop at the stowing position P3 without decelerating smoothly even when the rotation speed of the wiper motor 18 is slowed so as to stop the wiper blades 28 and 30 at the stowing position P3, in the present exemplary embodiment, the rotation of the wiper motor 18 is gradually slowed as the wiper blades 28 and 30 approach the permissible stop range R1. This thereby enables the wiper blades 28 and 30 to be stopped at the stowing position P3 or inside the permissible stop range R1 provided prior to the stowing position P3.

A lower permissible return position P5 is also provided prior to the lower return position P2, thereby forming, in a region between the lower return position P2 and the lower permissible return position P5, a lower permissible return range R2 in which it is possible for the wiper blades 28 and 30 to stop and to return.

An upper permissible return position P6 is also provided prior to the upper return position P1, thereby forming, in a region between the upper return position P1 and the upper permissible return position P6, an upper permissible return range R3 in which the wiper blades 28 and 30 are allowed to stop and to return.

Ideally the wiper blades 28 and 30 stop accurately at the upper return position P1 or the lower return position P2 when returning. However, sometimes it is difficult to stop the wiper blades 28 and 30 accurately at a specific position. In the present exemplary embodiment, rotation of the wiper motor 18 is gradually slowed as the wiper blades 28 and 30 approach the upper permissible return range R3 or the lower permissible return range R2, thereby enabling the wiper blades 28 and 30 to be stopped in the upper permissible return range R3 or in the lower permissible return range R2.

Note that, although the lower return position P2 is provided higher than the permissible stop range R1 in FIG. 1, the lower return position P2 may be provided within the permissible stop range R1 as long as the lower return position P2 is placed prior to the stowing position P3.

Moreover, the lower return position P2 and the stowing position P3 may be aligned with each other. The permissible stop range R1 and the lower permissible return range R2 overlap each other in such a case.

The wiper control circuit 22 is connected to the wiper motor 18 in order to control the rotation of the wiper motor 18.

The wiper control circuit 22 of the present exemplary embodiment is, for example, configured including a sensor 54 that detects a rotation speed and rotation angle of the output shaft 32 of the wiper motor 18, and a drive circuit 56 that generates a current for operating the wiper motor 18 using PWM control, and supplies the current to the wiper motor 18.

If the wiper motor 18 is a brushless DC motor, then the drive circuit 56 includes an inverter circuit in which a MOSFET is employed as a switching element, and outputs current with a specific duty ratio under control from a microcomputer 58, described later.

The wiper motor 18 according to the present exemplary embodiment includes a speed reduction mechanism 52 as mentioned above, and so the rotation speed and rotation angle of the output shaft 32 are not the same as the rotation speed and rotation angle of the wiper motor body. However, in the present exemplary embodiment, the wiper motor body and the speed reduction mechanism 52 are integrally configured inseparable to each other, and so the rotation speed and rotation angle of the output shaft 32 are taken as respective proxies for the rotation speed and rotation angle of the wiper motor 18 in below description.

The sensor 54 is provided inside the speed reduction mechanism 52 of the wiper motor 18, and is configured including an element (for example a Hall IC) to detect a magnetic field (magnetic force) of a magnet that rotates interlockingly with the output shaft 32.

The wiper control circuit according to the present exemplary embodiment is also configured including a memory 60 stored with data employed to control the microcomputer 58 and the drive circuit 56. The wiper switch 50 is connected to the microcomputer 58. The microcomputer 58 is capable of computing position of the wiper blades 28 and 30 on the front windshield 12 from the rotation angle of the output shaft 32 detected by the sensor 54, and controls the drive circuit 56 so as to change the rotation speed of the output shaft 32 according to this position.

The memory 60 is stored with speed maps in which the rotation frequency of the output shaft 32 is specified according to the position of the wiper blades 28 and 30 on the front windshield 12.

The microcomputer 58 controls the drive circuit 56 according to speed maps stored in the memory 60 while the wiper switch 50 is ON.

The wiper switch 50 is an ON/OFF switch for power supplied from a vehicle battery to the wiper motor 18.

The wiper switch 50 is switchable between a low speed operation mode selection position that causes the wiper blades 28 and 30 to swing at low speed, a high speed operation mode selection position that causes the wiper blades 28 and 30 to swing at high speed, an intermittent operation mode selection position that causes the wiper blades 28 and 30 to swing intermittently at a specific cycle, and a storage (stationary) mode selection position. The wiper switch 50 outputs to the microcomputer 58 a signal corresponding to the selection position for each mode.

When the signal corresponding to the selection position for each mode has been output from the wiper switch 50 to the wiper control circuit 22, the wiper control circuit 22 then performs control according to the output signal from the wiper switch 50, following the speed map stored in the memory 60.

Figure 2:
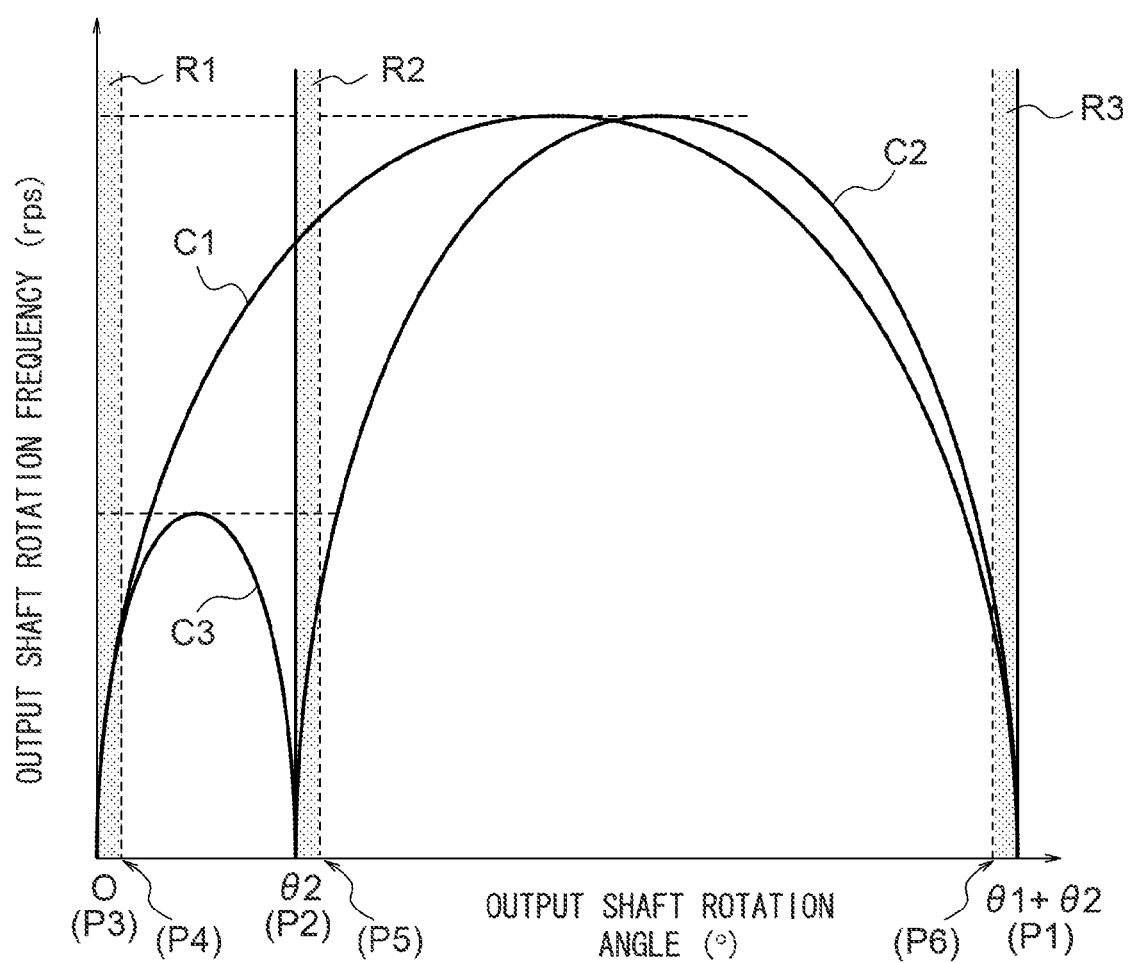
FIG. 2 is a graph illustrating a speed map of a wiper device according to the first exemplary embodiment of the present invention.

FIG. 2 is a graph illustrating an example of a speed map of the wiper device according to the present exemplary embodiment. The vertical axis of FIG. 2 is a rotation frequency of the output shaft 32 that varies according to the rotation speed of the wiper motor 18, and the horizontal axis is a rotation angle of the output shaft 32. The positions of the wiper blades 28 and 30 on the front windshield 12 are also shown in brackets on the horizontal axis corresponding to the rotation angle of the output shaft 32.

Three curves are illustrated in FIG. 2, with these being a startup speed map C1, a to-and-fro wiping operation speed map C2 and a stowage operation speed map C3.

The startup speed map C1 is employed when operation of the wiper motor 18 has been started from a stowed state of the wiper blades 28 and 30 at the stowing position P3. In the startup speed map C1, the rotation frequency of the output shaft 32 increases as the wiper blades 28 and 30 swing from the stowing position P3 to the upper return position P1, so as to configure a substantially semi-elliptical shaped path that has a maximum rotation frequency of the output shaft 32 in the vicinity of the midpoint between the stowing position P3 and the upper return position P1.

The to-and-fro wiping operation speed map C2 is employed when the wiper blades 28 and 30 are swinging to-and-fro between the lower return position P2 and the upper return position P1. In the to-and-fro wiping operation speed map C2, the rotation frequency of the output shaft 32 increases as the wiper blades 28 and 30 swing from the lower return position P2 towards the upper return position P1, so as to configure a substantially semi-elliptical shaped path that has a maximum rotation frequency of the output shaft 32 in the vicinity of the midpoint between the lower return position P2 and the upper return position P1.

The to-and-fro wiping operation speed map C2 is employed to return the wiper blades 28 and 30 at the upper return position P1, namely to return the wiper blades 28 and 30 from the upper return position P1 to the lower return position P2. In such cases, the rotation frequency of the output shaft 32 increases as the wiper blades 28 and 30 swing from the upper return position P1 to the lower return position P2, with the maximum rotation frequency of the output shaft 32 in the vicinity of the midpoint between the upper return position P1 and the lower return position P2.

Note that the maximum rotation frequency of the output shaft 32 is substantially the same in the startup speed map C1 and the to-and-fro wiping operation speed map C2. Vehicle mounted wiper devices are generally equipped with a low speed operation mode for swinging wiper blades at a low speed and a high speed operation mode for swinging the wiper blades at a high speed, and so configuration may be made with the startup speed map C1 and the to-and-fro wiping operation speed map C2 provided for the low speed operation mode and the high speed operation mode, respectively.

When the intermittent operation mode has been selected with the wiper switch 50, configuration may be made such that, the wiper blades 28 and 30 are stopped at the lower return position P2, then after a specific duration has elapsed, such as a few seconds to ten seconds, the wiper motor 18 is rotated so as to re-swing the wiper blades 28 and 30 according to the to-and-fro wiping operation speed map C2.

The stowage operation speed map C3 is a speed map employed when the wiper switch 50 is switched to the storage (stationary) mode selection position during operation of the wiper device.

During operation of the wiper device, the wiper motor 18 is rotated forwards and backwards according to the to-and-fro wiping operation speed map C2, and the wiper blades 28 and 30 swing to-and-fro between the upper return position P1 and the lower return position P2. Consequently, the stowage operation speed map C3 specifies the rotation frequency of the output shaft after the wiper blades 28 and 30 have been returned to the lower return position P2 and when they are being returned from the lower return position P2 to the stowing position P3.

In the stowage operation speed map C3, the rotation frequency of the output shaft 32 increases as the wiper blades 28 and 30 swing from the lower return position P2 to the stowing position P3, with the stowage operation speed map C3 configuring a substantially semi-elliptical shaped path with a maximum rotation frequency of the output shaft 32 in the vicinity of the midpoint between the lower return position P2 and the stowing position P3.

In the present exemplary embodiment, when the wiper switch 50 is switched to the storage (stationary) mode selection position during to-and-fro swinging of the wiper blades, the rotation of the wiper motor 18 is controlled according to the to-and-fro wiping operation speed map C2 until the wiper blades have reached lower return position P2.

After the wiper blades have reached the lower return position P2, the rotation of the wiper motor 18 is then controlled according to the stowage operation speed map C3.

Note that the maximum rotation frequency of the output shaft 32 specified by the stowage operation speed map C3 is a lower speed than the maximum rotation frequency as specified by each of the startup speed map C1 and the to-and-fro wiping operation speed map C2. This is because the distance from the lower return position P2 to the stowing position P3 is short, and so, if the rotation frequency of the output shaft 32 were made high, then the wiper blades 28 and 30 would accelerate and decelerate abruptly on the front windshield 12 to stop at the stowing position P3, which would be detrimental to smooth operation.

Note that preferably the wiper blades 28 and 30 accurately stop at the upper return position P1, the lower return position P2 and the stowing position P3. However, it is conceivable that in actual operation, sometimes the wiper blades 28 and 30 will stop prior to the upper return position P1, the lower return position P2 or the stowing position P3 due to friction between the surface of the front windshield 12 and the wiper blades 28 and 30.

In FIG. 2, in each of the maps, the rotation speed of the wiper motor 18 is gradually slowed such that the rotation frequency of the output shaft 32 is "0" at the upper return position P1, at the lower return position P2 and at the stowing position P3. However, in the present exemplary embodiment, the wiper blades 28 and 30 are allowed to stop in the upper permissible return range R3, in the lower permissible return range R2 or in the permissible stop range R1 that are provided respectively prior to the upper return position P1, the lower return position P2 and the stowing position P3.

The upper return position P1, the lower return position P2 and the stowing position P3 are target positions to stop the wiper blades 28 and 30. In actual operation, the wiper blades 28 and 30 may stop in the specific regions provided prior to the stop target positions where stopping is allowed.

Namely, when the wiper blades 28 and 30 have stopped in the permissible stop range R1 then this is interpreted as if the wiper blades 28 and 30 are stored in the stowing position P3.

Moreover, when the wiper blades 28 and 30 are stopped in the upper permissible return range R3 or the lower permissible return range R2, the wiper blades 28 and 30 are allowed to return from their stopped position.

Moreover, movement of the wiper blades 28 and 30 is also allowed from the lower permissible return range R2 to the stowing position P3 after the wiper blades 28 and 30 has stopped at the range R2.

Figure 3:
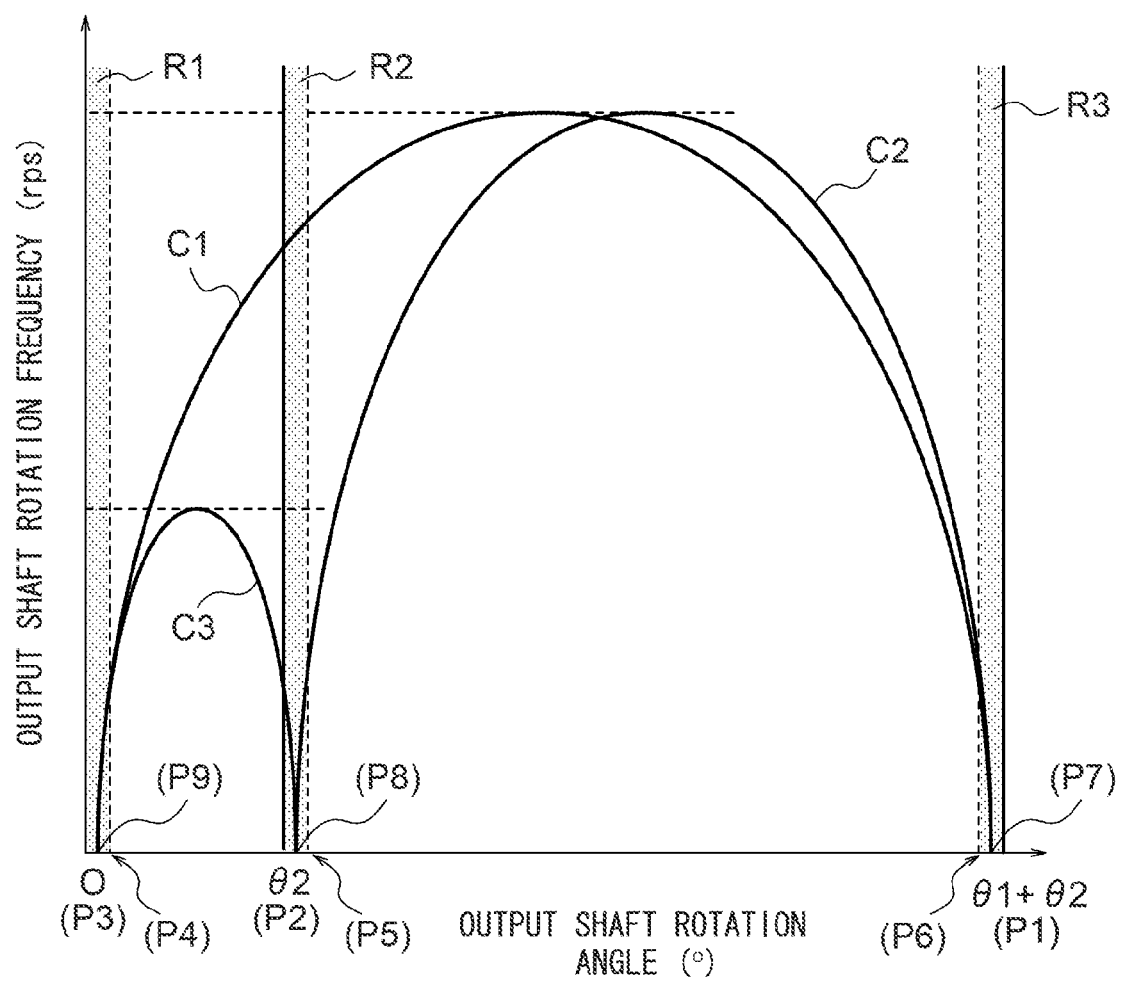
FIG. 3 is a graph illustrating a modified example of a speed map of a wiper device according to the first exemplary embodiment.

FIG. 3 is a modified example of a speed map of the present exemplary embodiment. In the modified exemplary embodiment, an upper return target position P7 is set between the upper return position P1 and the upper permissible return position P6, namely in the upper permissible return range R3.

Moreover, the rotation frequency of the output shaft 32 is specified as "0" at the upper return target position P7 in the startup speed map C1 and in the to-and-fro wiping operation speed map C2.

In FIG. 3, the upper return target position P7 is a target position to stop the wiper blades 28 and 30. By thus controlling the rotation speed of the wiper motor 18 such that the wiper blades 28 and 30 are stopped at the upper return target position P7, overrun or abrupt deceleration of the wiper blades 28 and 30 at the upper return position P1 can be prevented.

In the to-and-fro wiping operation speed map C2, when the wiper blades 28 and 30 swing from the upper return position P1 to the lower return position P2, the rotation frequency of the output shaft 32 is specified so as to be "0" at a lower return target position P8 provided in the lower permissible return range R2 prior to the lower return position P2.

In the stowage operation speed map C3, the rotation frequency of the output shaft 32 is specified so as to be "0" at a stowage target position P9 provided in the permissible stop range R1prior to the stowing position P3.

Thus as described above, target positions for stopping are specified prior to the lower return position P2 and the stowing position P3, and the speed maps specify the rotation frequency of the output shaft 32 as "0" at these stop targets. The wiper blades 28 and 30 can accordingly be prevented from overrunning or decelerating abruptly at the lower return position P2 or the stowing position P3.

Figure 4:
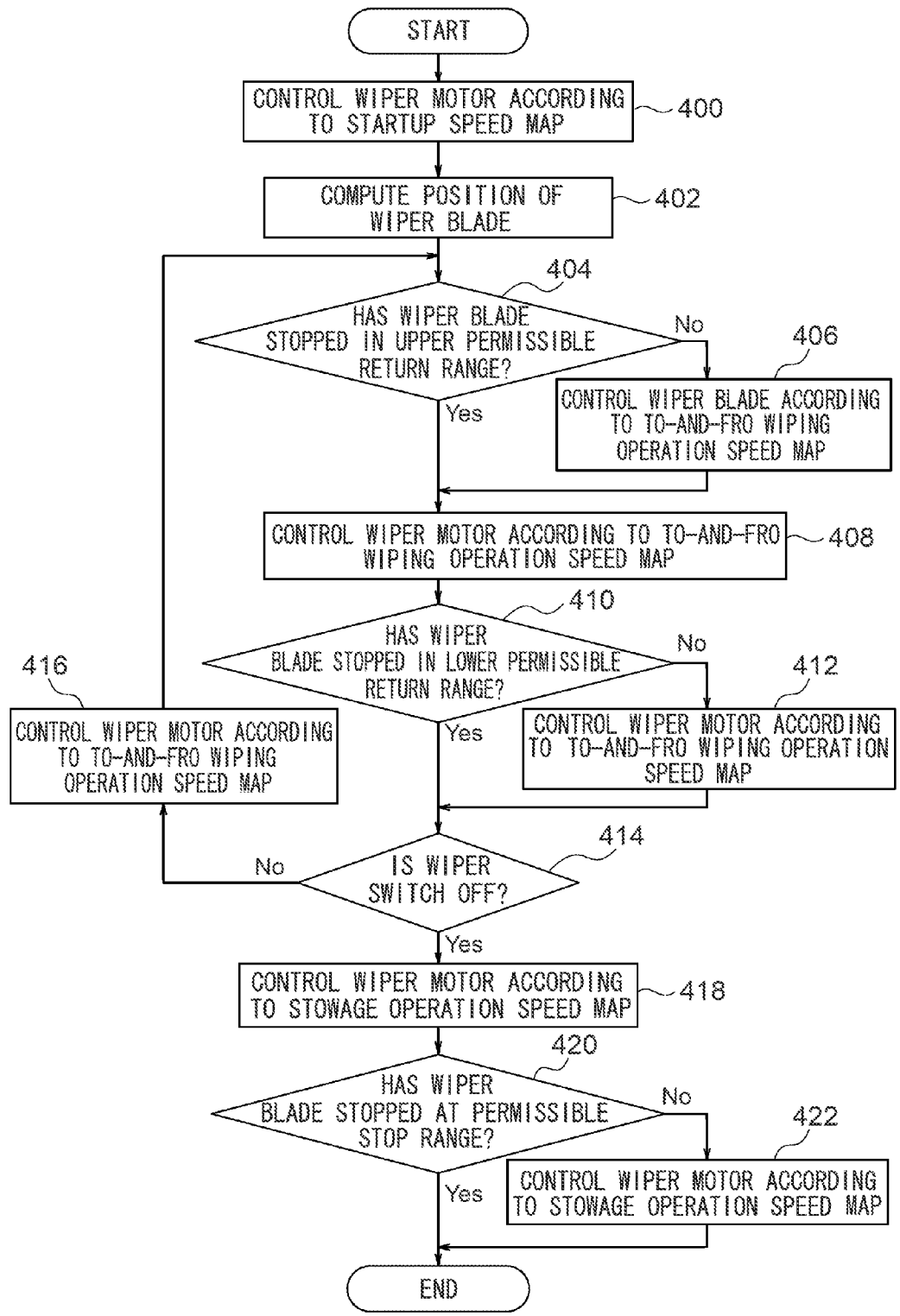
FIG. 4 is a flow chart illustrating control of a microcomputer in the first exemplary embodiment of the present invention.

Explanation next follows regarding control in the present exemplary embodiment. FIG. 4 is a flow chart relating to control of the microcomputer 58 in the present exemplary embodiment.

The control illustrated in FIG. 4 is started when the wiper switch 50 is switched from the storage (stationary) mode selection position to the low speed operation mode selection position, the high speed operation mode selection position, or the intermittent operation mode selection position.

First, at step 400, rotation of the wiper motor 18 is controlled according to the startup speed map C1.

At step 402, computation of the position of the wiper blades 28 and 30 on the front windshield 12 is started from the rotation angle of the output shaft 32 detected by the sensor 54. The rotation frequency of the output shaft 32 is also computed from the rotation angle of the output shaft 32, and monitoring is performed of whether or not the wiper motor 18 is being controlled under the startup speed map C1.

At step 404, determination is made as to whether or not the wiper blades 28 and 30 are stopped at the upper permissible return range R3. The procedure proceeds to step 408 when affirmative determination is made. However when negative determination is made, then at step 406, the wiper motor 18 is rotated employing to-and-fro wiping operation speed map C2, and the wiper blades 28 and 30 are stopped at the upper permissible return range R3.

Note that although the rotation of the wiper motor 18 is controlled employing the to-and-fro wiping operation speed map C2 at step 406, the rotation of the wiper motor 18 may alternatively be controlled according to the startup speed map C1.

At step 408, the rotation of the wiper motor 18 is controlled using the to-and-fro wiping operation speed map C2 such that the wiper blades 28 and 30 are swung from the upper permissible return range R3 to the lower permissible return range R2.

At step 410, determination is made as to whether or not the wiper blades 28 and 30 are stopped at the lower permissible return range R2. The procedure proceeds to step 414 when affirmative determination is made. However when negative determination is made, the wiper motor 18 is rotated at step 412 employing the to-and-fro wiping operation speed map C2, and the wiper blades 28 and 30 are stopped at the lower permissible return range R2.

At step 414, determination is made as to whether or not the wiper switch 50 has been switched to the storage (stationary) mode selection position. When negative determination is made, then at step 416 rotation of the wiper motor 18 is controlled employing the to-and-fro wiping operation speed map C2 such that the wiper blades 28 and 30 are swung from the lower permissible return range R2 to the upper permissible return range R3, and then the procedure returns to step 404.

When affirmative determination is made at step 414, then at step 418, the rotation of the wiper motor 18 is controlled according to the stowage operation speed map C3 such that the wiper blades 28 and 30 are swung from the lower permissible return range R2 to the permissible stop range R1.

At step 420, determination is made as to whether or not the wiper blades 28 and 30 have stopped at the permissible stop range R1. Processing is ended when affirmative determination is made. However when negative determination is made, then at step 422, the wiper motor 18 is rotated employing the stowage operation speed map C3 and the wiper blades 28 and 30 are stopped at the permissible stop range R1, then the processing is ended.

As explained above, according to the present exemplary embodiment, regions where the wiper blades are allowed to stop are provided prior to the stop positions, and regions where the wiper blades are allowed to return are provided prior to the return positions, such that the wiper blades can stop or return in these regions. Overrun of the wiper blade at the stop positions or the return positions can accordingly be prevented, and this also enables irregular noise to be prevented from occurring due to the wiper blades abruptly decelerating at the stop positions or the return positions.

Note that in the present exemplary embodiment, when the wiper switch 50 is switched OFF, the rotation of the wiper motor 18 is controlled under the to-and-fro wiping operation speed map C2 as far as the lower return position P2, and then the rotation of the wiper motor 18 is controlled from the lower return position P2 under the stowage operation speed map C3.

However, configuration may be made such that when the wiper switch 50 is switched OFF, the wiper motor 18 is immediately switched from control by the to-and-fro wiping operation speed map C2 to control by the startup speed map C1.

In such cases, control of the wiper motor 18 is switched from using the to-and-fro wiping operation speed map C2 to using the startup speed map C1 illustrated in FIG. 2, and the rotation speed of the wiper motor 18 is slowed as the wiper blades 28 and 30 approach the stowing position P3.

Under such control, the wiper blades 28 and 30 can be stopped at the stowing position P3 without temporarily stopping the wiper blades 28 and 30 at the lower return position P2. For example, the wiper blades 28 and 30 can be stopped at the stowing position P3 or in the permissible stop range R1 by slowing the rotation speed of the wiper motor 18 as the wiper blades 28 and 30 move from the vicinity of the midpoint of the to-and-fro swinging process so as to approach the stowing position P3.

Figure 5:
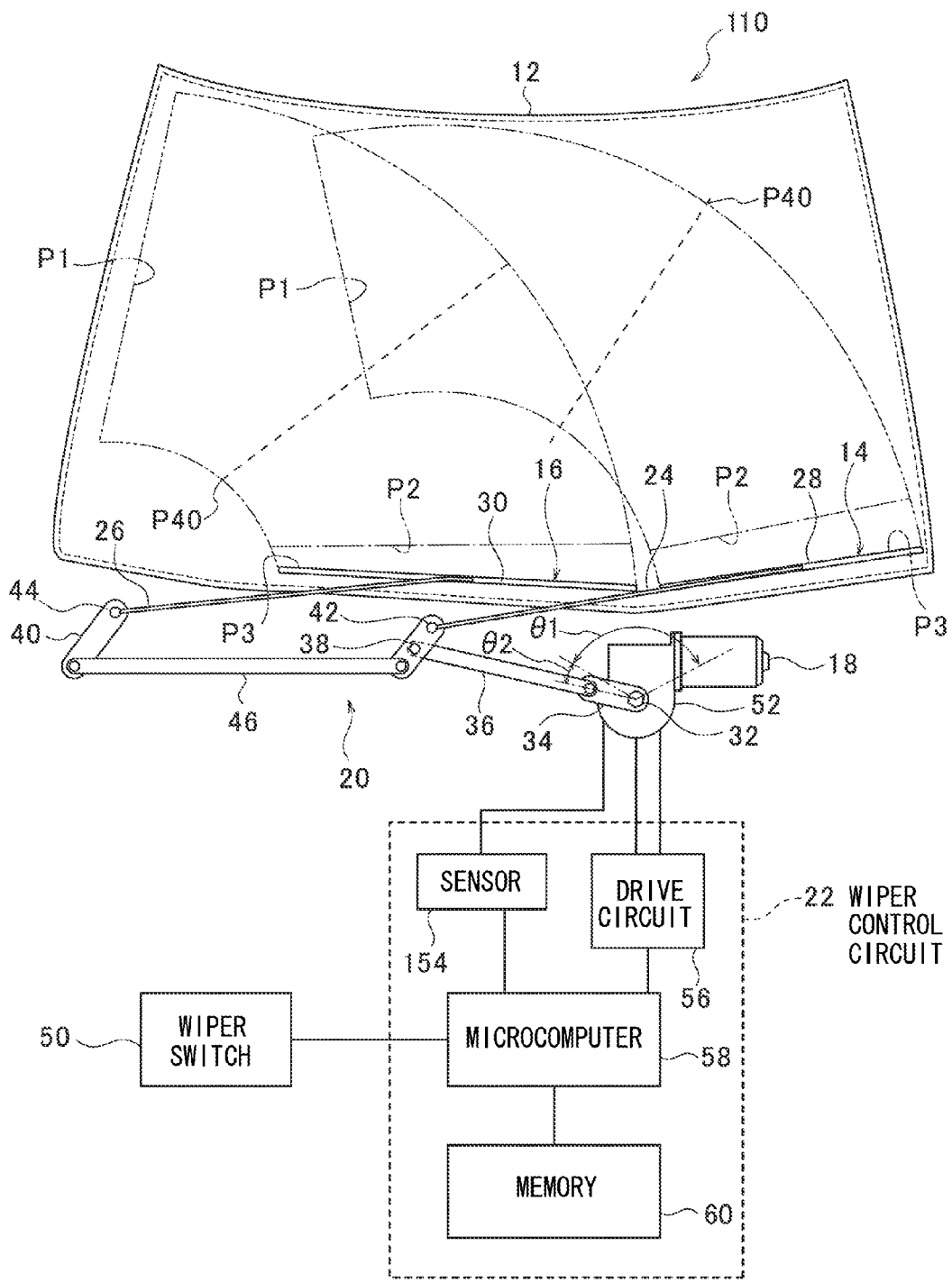
FIG. 5 is a schematic diagram illustrating a configuration of a wiper device according to a second exemplary embodiment of the present invention.

Explanation next follows regarding the second exemplary embodiment. FIG. 5 is a schematic diagram illustrating a configuration of a wiper device 110 according to the second exemplary embodiment. The wiper device 110 is similar in structure to the wiper device 10. Hence similar portions to portions of the wiper device 10 are allocated the same reference numerals and further explanation thereof is omitted.

In the present exemplary embodiment, a central position P40 between the upper return position P1 and the stowing position P3 of the wiper blades 28 and 30 is employed.

Figure 6:
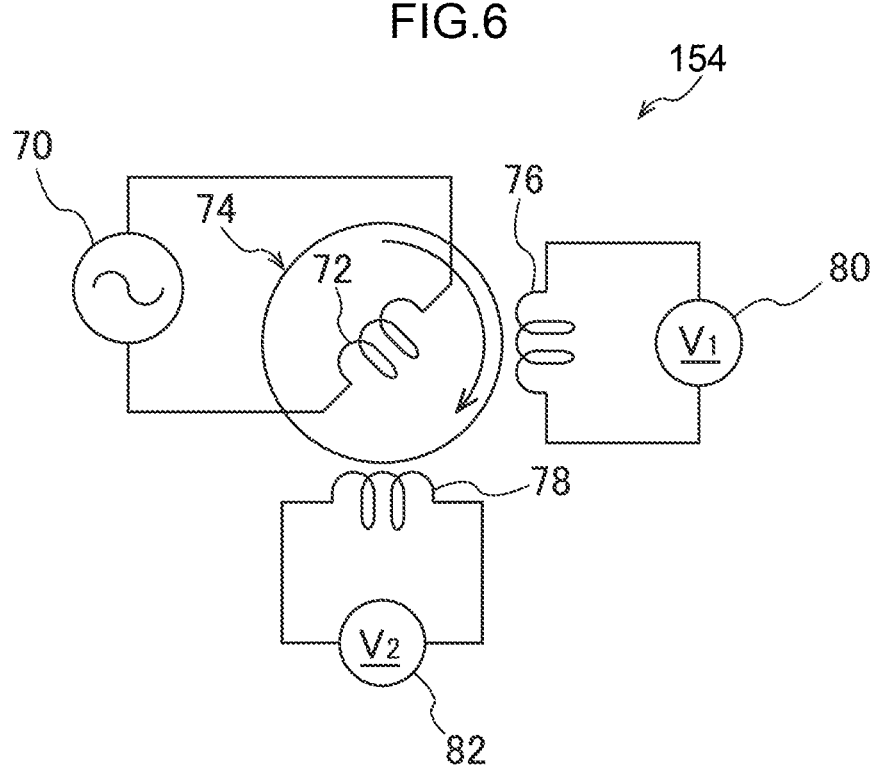
FIG. 6 is a diagram illustrating an example of a sensor according to the second exemplary embodiment of the present invention.

FIG. 6 is a diagram illustrating an example of a sensor 154 according to the present exemplary embodiment. The sensor 154 illustrated in FIG. 6 includes an excitation coil 72 that magnetically excites with power supplied from an alternating current source 70, and includes a rotor 74 that rotates with the output shaft 32.

A first detection coil 76 and a second detection coil 78 are provided in the vicinity of the rotor 74 for detecting a magnetic field emitted by the excitation coil 72.

The first detection coil 76 and the second detection coil 78 are placed such that a line connecting the center of the second detection coil 78 and the center of the rotor 74, and a line connecting the center of the first detection coil 76 and the rotor 74 meet at 90°.

A first voltmeter 80 is provided at the first detection coil 76 and a second voltmeter 82 is provided at the second detection coil 78.

Figure 7:
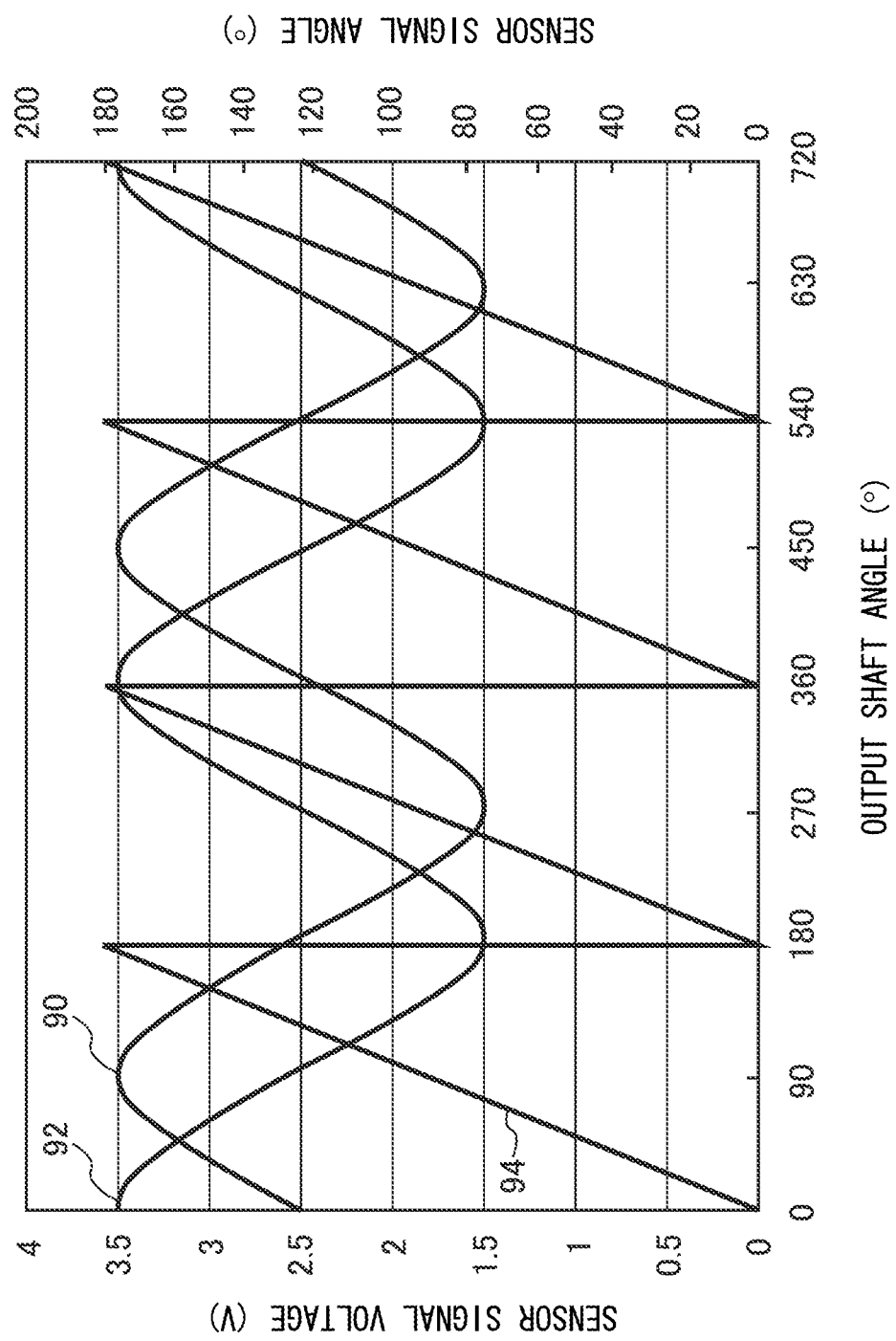
FIG. 7 is a graph illustrating an example of output from sensors according to the second exemplary embodiment of the present invention.

FIG. 7 illustrates an example of output of the sensor 154 according to the present exemplary embodiment. The sensor 154 includes the two detection coils that are disposed at 90° to each other, and hence two sine waves are output at phases shifted by 90° from each other, as illustrated in FIG. 7. In the present exemplary embodiment, the two sine waves are a sine wave 90 and a cosine wave 92. The sine wave 90 expresses a voltage value of current detected by the first detection coil 76, and the cosine wave 92 expresses a voltage value of the current detected by the second detection coil 78.

In FIG. 7, the sine wave 90 and the cosine wave 92 can be expressed by following Equation (1) and Equation (2), wherein the detection axis angle is denoted by θ.

$$\text{sine wave 90: } y = \sin \theta \quad \text{Equation (1)}$$

$$\text{cosine wave 92: } y = \cos \theta \quad \text{Equation (2)}$$

Moreover, the quotient obtained by dividing the sine by the cosine is the tangent expressed by following Equation (3).

$$\sin \theta / \cos \theta = \tan \theta \quad \text{Equation (3)}$$

Moreover, the sensor signal angle is computed by processing the inverse tangent function $\tan^{-1}$ of the tangent computed by Equation (3). Thus computed sensor signal angle is illustrated by the zig-zag line 94 in FIG. 7. The computed sensor signal angle corresponds to an "output shaft angle" on the horizontal axis of FIG. 7.

Note that in the present exemplary embodiment, the above computation is performed by processing with a dedicated IC based on a trigonometric function.

Figure 8:
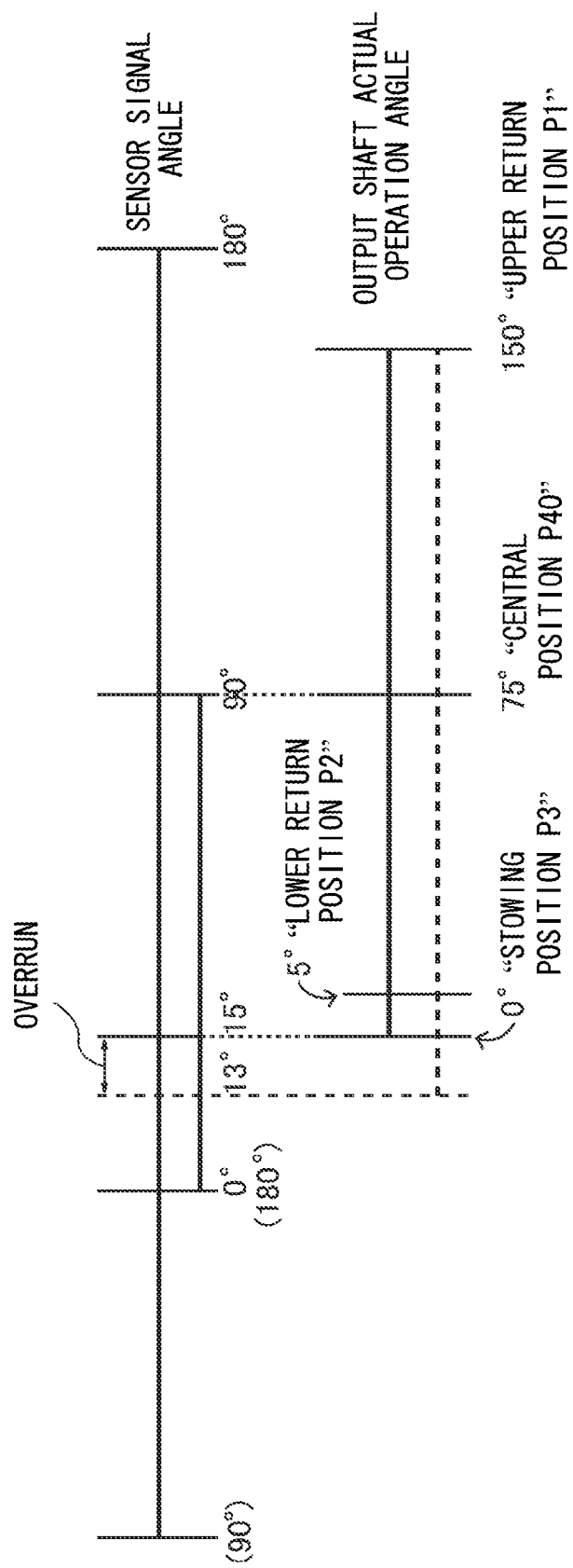
FIG. 8 is a chart illustrating correspondences between sensor signal angle and actual operation angle of an output shaft in the second exemplary embodiment of the present invention.

FIG. 8 is a diagram illustrating correspondences between a sensor signal angle and actual operation angle of the output shaft 32 in the present exemplary embodiment.

In the present exemplary embodiment, a central value of the rotation angle of the output shaft 32 of the wiper motor 18, when the wiper blades 28 and 30 are swinging to-and-fro, is allocated to be in the vicinity of a central value of the angular range detectable by the sensor 154.

In FIG. 8, the rotation angles of the output shaft 32 when the wiper blades 28 and 30 have swung from the stowing position P3 to the upper return position P1 are shown as the output shaft actual operation angle. The output shaft actual operation angle is 0° when the wiper blades 28 and 30 are at the stowing position P3, and is 150° when the wiper blades 28 and 30 have reached the upper return position P1.

When the output shaft actual operation angle is 75° which is the central value from 0° to 150°, the wiper blades 28 and 30 are positioned at the central position P40 at the midpoint between the stowing position P3 and the upper return position P1.

The sensor signal angle of the rotation angle of the output shaft 32 detected by the sensor 154 is illustrated at the top of FIG. 8. The detection range of a sensor that detects rotation angle is generally from 0° to 180°, and the sensor 154 of the present exemplary embodiment also has a detection range of sensor signal angles from 0° to 180°. The central value of the detection range of the sensor 154 in the present exemplary embodiment is accordingly 90°.

In the present exemplary embodiment, as illustrated in FIG. 8, the central value 75° of the output shaft actual operation angle is interpreted as being in the vicinity of the central value 90° of the detection range of the sensor 154. Setting may then be made to enable the wiper blades to be returned at the lower return position P2 or to be stored at the stowing position P3 when the signal angle detected by the sensor 154 is at a specific range of angle which is equal to or greater than the lower limit 0° of the detection range of the sensor 154. Moreover, settings may be made to enable the wiper blades to be returned at the upper return position P1 when the sensor signal angle detected by the sensor 154 is a specific range of angle which is equal to or smaller than the upper limit 180° of the detection range of the sensor 154. Note that the above specific angle range may, for example, be set between 0° and 20° for the return at the lower return position P2 and between 0° and 15° for the store at the stowing position P3.

At the left side portion of FIG. 8, the wiper blades 28 and 30 are illustrated as having gone past the stowing position P3, namely illustrated in an overrun situation. Suppose that, as illustrated in FIG. 8, even when the wiper blades 28 and 30 overrun by 2° of the output shaft actual operation angle from the stowing position P3, the sensor signal angle detected in such a case would be 13°, which would still exceed the lower limit value of the detection range of the sensor 154, this being 0°, and would lie within the specific angle range. The swing direction of the wiper blades 28 and 30 would accordingly not be controlled wrongly.

Figure 9:
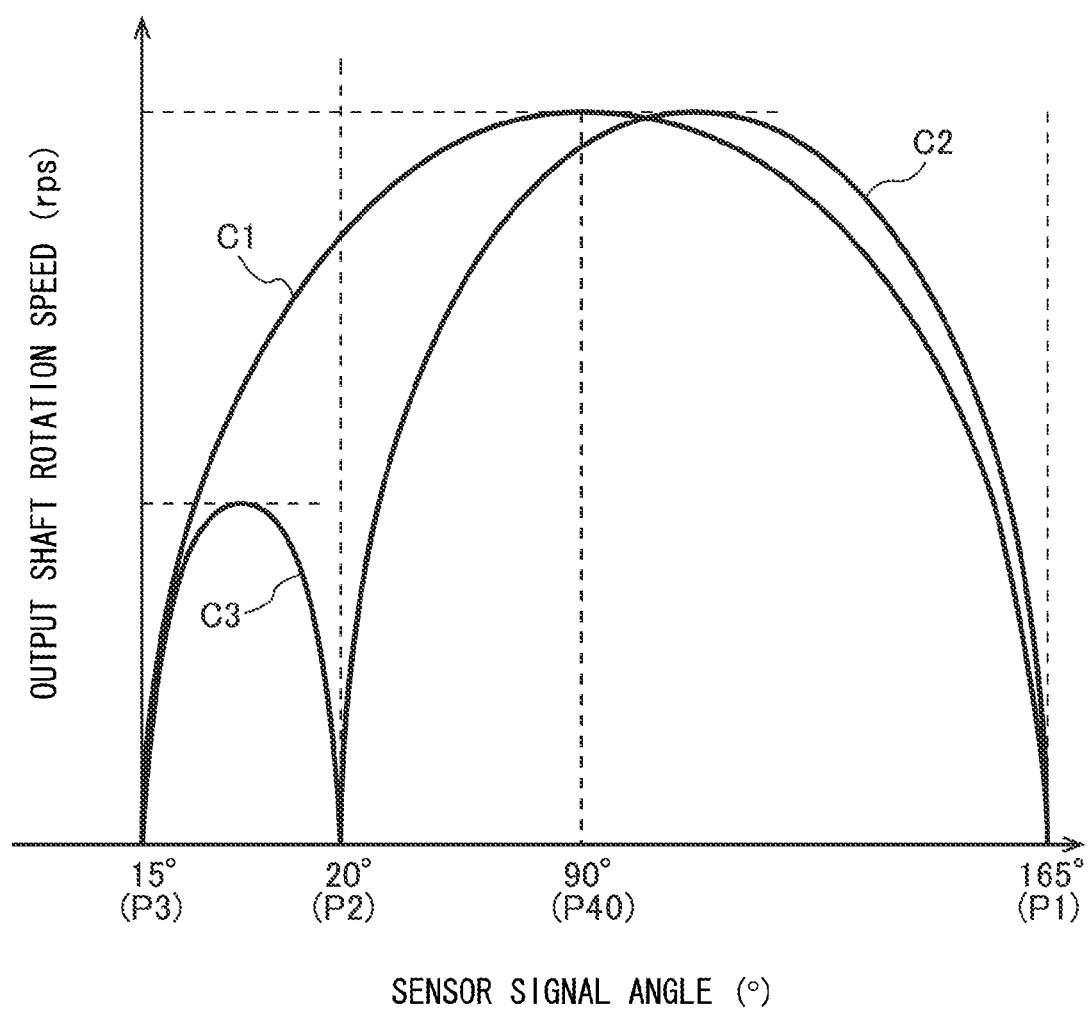
FIG. 9 is a graph illustrating an example of a speed map specifying an output shaft rotation speed of a wiper motor in the second exemplary embodiment of the present invention.

FIG. 9 is a graph illustrating an example of a speed map for designating a rotation frequency of the output shaft 32 of the wiper motor 18 according to the present exemplary embodiment.

The startup speed map C1 in FIG. 9 is a speed map employed when operation of the wiper motor 18 has been started from a stowed state of the wiper blades 28 and 30 at the stowing position P3. In the startup speed map C1, the rotation frequency of the output shaft 32 increases as the wiper blades 28 and 30 swing from the stowing position P3 to the upper return position P1, so as to configure a substantially semi-elliptical shaped path that has a maximum rotation frequency of the output shaft 32 in the vicinity of midpoint position P40 that is the midpoint between the stowing position P3 and the upper return position P1.

On the horizontal axis of FIG. 9, in the vicinity of the central position P40, the sensor signal angle is set to be the central value of the detection range of the sensor 154, this being 90°.

Setting is made such that the wiper blades 28 and 30 are stowed at the stowing position P3 when the sensor signal angle is 15°, the wiper blades 28 and 30 return at the lower return position P2 when the sensor signal angle is 20°, and the wiper blades 28 and 30 return at the upper return position P1 when the sensor signal angle is in 165°.

Moreover, setting is made such that the wiper blades can be stowed at the stowing position P3 when the signal angle is in the specific angle range that is the lower limit value of the detection range of the sensor 154, this being 0°, or greater, even when the signal angle detected by the sensor 154 is smaller than 15° because the wiper blades have overrun. Setting is also made such that the wiper blades can be returned at the lower return position P2 when the signal angle is in the specific angle range that is the lower limit value of the detection range of the sensor 154, this being 0°, or greater, even when the signal angle detected by the sensor 154 is smaller than 20° because the wiper blades have overrun. Moreover, setting is made such that the wiper blades can be returned at the upper return position P1 when the sensor signal angle is in the specific angle range that is the upper limit value of the detection range of the 154, this being 180°, or lower, even when the sensor signal angle detected by the sensor 154 is larger than 165° because the wiper blades have overrun.

In the present exemplary embodiment, there are various conceivable methods to interpret the central value of the rotation angle of the output shaft 32 of the wiper motor 18 as being in the vicinity of the central value of the detection range of the sensor 154.

One conceivable method is to displace attachment position of the sensor 154 by a specific angle from the standard position.

For example, in the present exemplary embodiment, attachment position of the sensor 154 is adjusted such that the sensor signal angle detected by the sensor 154 is 15° when the wiper blades 28 and 30 are disposed at the stowing position P3.

Another method is to correct the sensor signal angle detected by the sensor 154, and to control the rotation of the wiper motor 18 according to the post-correction sensor signal angle.

Figure 10:
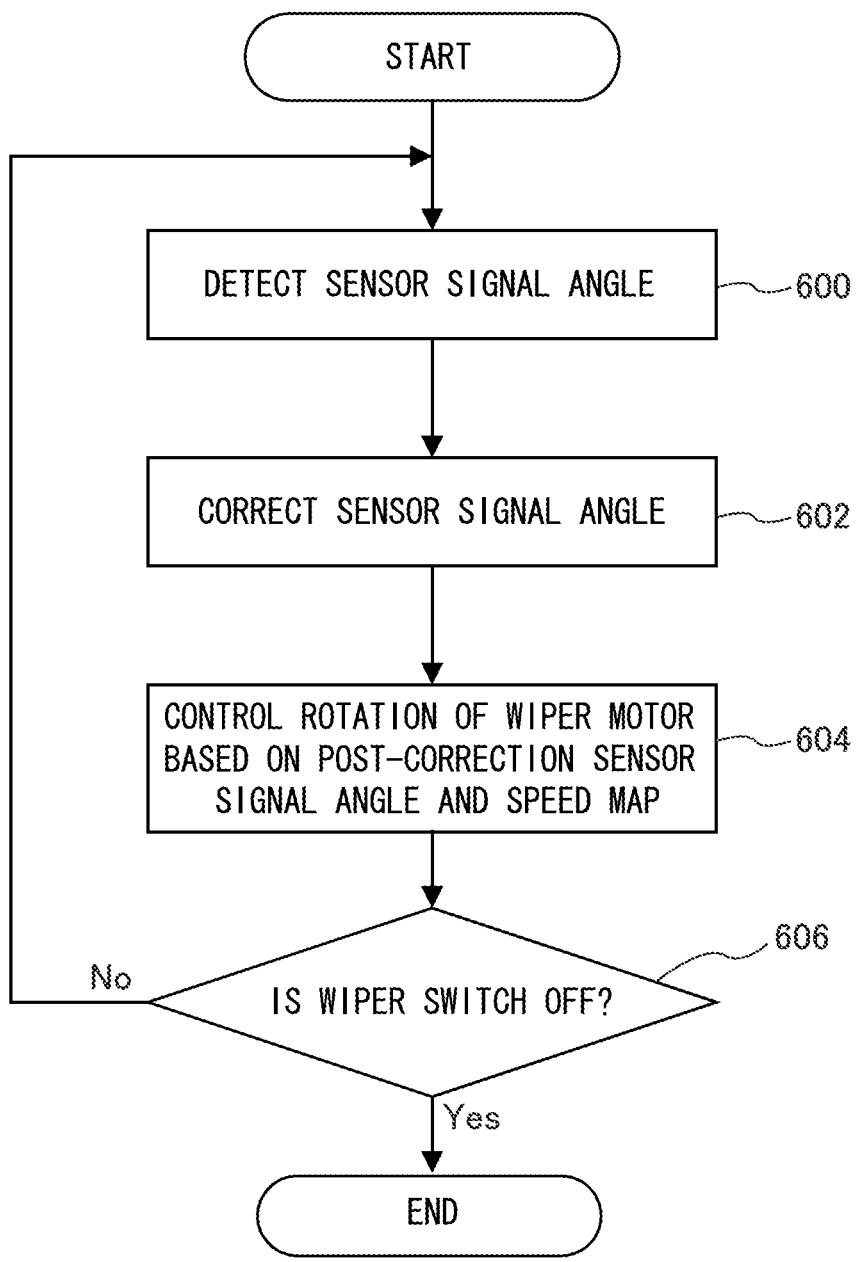
FIG. 10 is a flow chart illustrating sensor signal angle correction and control of rotation of a wiper motor with the corrected sensor signal angle in the second exemplary embodiment of the present invention.
Figure 11:
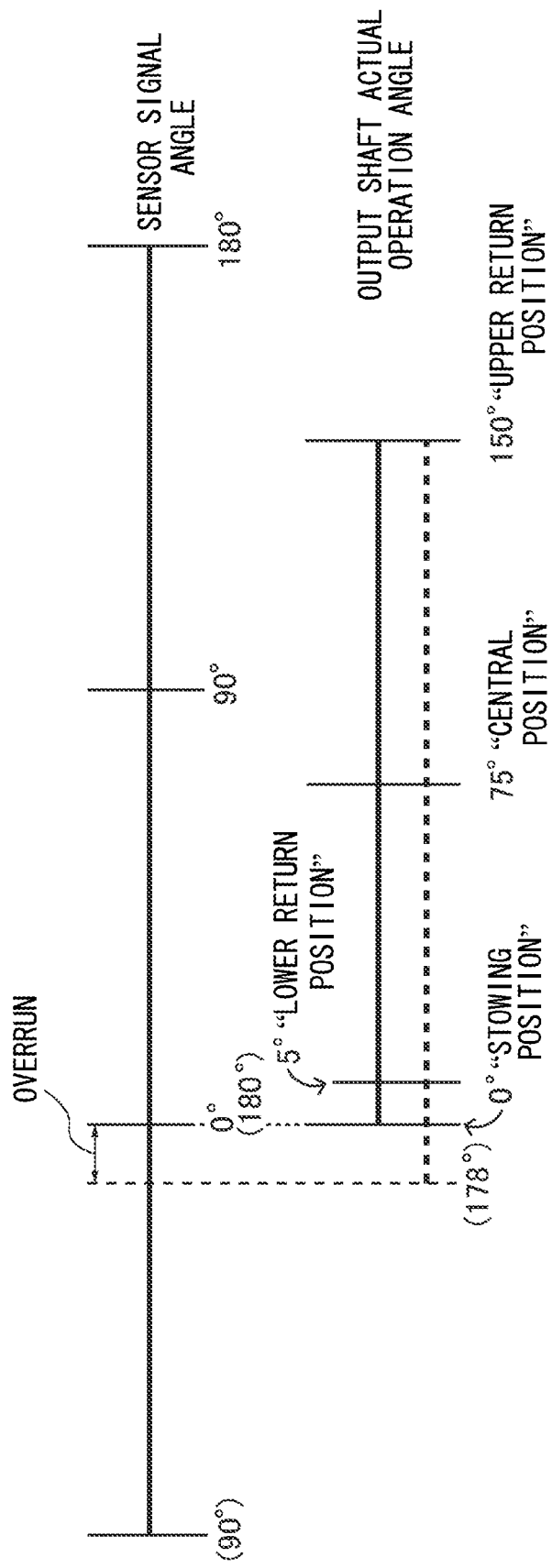
FIG. 11 is a chart illustrating correspondences between sensor signal angle and actual operation angle in an ordinary wiper device.

FIG. 10 is a flow chart illustrating correction of sensor signal angle and control of rotation of the wiper motor 18 according to the corrected sensor signal angle in the present exemplary embodiment.

The control illustrated in FIG. 10 is started when the wiper switch 50 is switched over from the storage (stationary) mode selection position to the low speed operation mode selection position, the high speed operation mode selection position, or the intermittent operation mode selection position.

First, at step 600, the sensor signal angle is detected. When the sensor 154 is attached in the standard position and the wiper blades 28 and 30 are at the stowing position P3, then the rotation angle of the output shaft 32 is 0°, and the sensor signal angle at step 600 is 0°.

At step 602, the sensor signal angle is corrected. As an example, in the present exemplary embodiment, the sensor signal angle is corrected so as to be 15° when the wiper blades 28 and 30 are at the stowing position P3. The correction angle of 15° is determined according to the present circumstances, as described above, that the central value 75° of the rotation angle of the output shaft 32 is interpreted as being in the vicinity of the central value 90° of the detection range of the sensor 154 under the conditions that the rotation angles of the output shaft 32 of the wiper motor 18 are from 0° to 150°, and the detection range of the sensor 154 is from 0° to 180°.

The correction angle, that is 15° in the present exemplary embodiment, may be changed by appropriate variation according to the rotation angle of the output shaft 32 of the wiper motor 18 and/or the detection range of the sensor 154.

At step 604, the rotation of the wiper motor 18 is controlled based on the post-correction sensor signal angle and the speed maps stored in the memory 60.

At step 606, determination is made as to whether or not the wiper switch 50 has been switched to the storage (stationary) mode selection position. The procedure returns to step 600 when negative determination is made, however the processing is ended when affirmative determination is made.

As explained above, according to the present exemplary embodiment, the sensor signal angle detected by the sensor is corrected such that the central value of the rotation angles of the wiper motor is interpreted as being in the vicinity of the central value of the detection range of the sensor. So doing prevents the rotation direction of the wiper blades from being wrongly reversed since the detected sensor signal angles are within an angular range where it is possible for the wiper blades to return or stowage even in cases in which the wiper blades have overrun a specific position for stopping or for returning.

What is claimed is:

1. A wiper device comprising:
a wiper motor that rotates forwards and rotates backwards at a specific rotation angle, and swings a wiper blade coupled to the wiper motor through a wiper arm to-and-fro across a window glass;
a storage section that is stored with specific positions at an upper portion and a lower portion of a region on the window glass where the wiper blade swings to-and-fro as a first upper stop target position and a first lower stop target position, the first upper stop target position and the first lower stop target position being positions where the wiper blade is intended to stop, and the storage section storing specific ranges from the first upper stop target position to a lower side and from the first lower stop target position to an upper side on the window glass as an upper permissible stop range and a lower permissible stop range, the upper permissible stop range and the lower permissible stop range being ranges where the wiper blade is allowed to stop;
a detection section that detects rotation speed and rotation angle of the wiper motor; and
a control section that refers to the storage means, identifies the position of the wiper blade on the window glass based on the rotation angle of the wiper motor detected by the detection means, reduces the rotation speed of the wiper motor as the to-and-fro swinging wiper blade approaches the upper permissible stop range or the lower permissible stop range, and stops the wiper motor rotation when the wiper blade has stopped in the upper permissible stop range or in the lower permissible stop range.

2. The wiper device of claim 1 wherein the control means:
reduces the rotation speed of the wiper motor as the swinging wiper blade approaches the first upper stop target position or the first lower stop target position from the vicinity of a midpoint in the to-and-fro swing process;
stops the wiper motor rotation when the wiper blade has stopped in the upper permissible stop range or in the lower permissible stop range; and
after stopping, rotates the wiper motor in an opposite direction to the direction prior to stopping so as to swing the wiper blade that has stopped in the permissible stop range.

3. The wiper device of claim 2 wherein:
the wiper device further comprises a wiper switch to input an instruction to operate or stop the wiper motor;
the storage means is respectively stored with a lower return position and a stowing position as the first lower stop target position, the lower return position is the position where the to-and-fro swinging wiper blade stops in order to return and the stowing position is provided at a lower portion of the lower return position in order to store the wiper blade, the storage means is stored with a specific range from the lower return position to an upper side on the window glass as a first lower permissible stop range and a specific range from the stowing position to an upper side on the window glass as a second lower permissible stop range, and the first and the second lower permissible stop ranges are ranges where the wiper blade is allowed to stop; and
the control means reduces the rotation speed of the wiper motor as the wiper blade approaches the lower return position when, during to-and-fro swinging of the wiper blade, an instruction is input from the wiper switch to stop the wiper motor; rotates the wiper motor at a slower speed to that of to-and-fro swinging after the wiper blade has stopped in the first lower permissible stop range including the lower return position, reduces the rotation speed of the wiper motor as the wiper blade approaches the stowing position, and stops wiper motor rotation when the wiper blade has stopped in the second lower permissible stop range including the stowing position.

4. The wiper device of claim 3, wherein the control means:
moves the wiper blade towards the stowing position without stopping in the first lower permissible stop range when, during to-and-fro swinging of the wiper blade, an instruction is input from the wiper switch to stop the wiper motor;
reduces the rotation speed of the wiper motor as the wiper blade approaches the stowing position; and stops wiper motor rotation when the wiper blade has stopped in the second lower permissible stop range including the stowing position.

5. The wiper device of claim 1 wherein:

the wiper device further comprises a wiper switch to input an instruction to operate or stop the wiper motor;

the storage means is respectively stored with a lower return position and a stowing position as the first lower stop target position, the lower return position is the position where the to-and-fro swinging wiper blade stops in order to return and the stowing position is provided at a lower portion of the lower return position in order to store the wiper blade, the storage means is stored with a specific range from the lower return position to an upper side on the window glass as a first lower permissible stop range and a specific range from the stowing position to an upper side on the window glass as a second lower permissible stop range, and the first and the second lower permissible stop ranges are ranges where the wiper blade is allowed to stop; and the control means reduces the rotation speed of the wiper motor as the wiper blade approaches the lower return position when, during to-and-fro swinging of the wiper blade, an instruction is input from the wiper switch to stop the wiper motor; rotates the wiper motor at a slower speed to that of to-and-fro swinging after the wiper blade has stopped in the first lower permissible stop range including the lower return position; reduces the rotation speed of the wiper motor as the wiper blade approaches the stowing position; and stops wiper motor rotation when the wiper blade has stopped in the second lower permissible stop range including the stowing position.

6. The wiper device of claim 5, wherein the control means:

moves the wiper blade towards the stowing position without stopping in the first lower permissible stop range when, during to-and-fro swinging of the wiper blade, an instruction is input from the wiper switch to stop the wiper motor;

reduces the rotation speed of the wiper motor as the wiper blade approaches the stowing position; and stops wiper motor rotation when the wiper blade has stopped in the second lower permissible stop range including the stowing position.

7. The wiper device of claim 1, wherein:

a second upper stop target position is provided in the upper permissible stop range;

a second lower stop target position is provided in the lower permissible stop range; and the control means reduces the rotation speed of the wiper motor as the swinging wiper blade approaches the second upper stop target position or the second lower stop target position from the vicinity of a midpoint in the to-and-fro swing process.

* * * * *